United States Patent [19]

Waddill

[11] 4,420,606
[45] Dec. 13, 1983

[54] ONE COMPONENT WATER REDUCED EPOXY ADHESIVES

[75] Inventor: Harold G. Waddill, Austin, Tex.

[73] Assignee: Texaco Inc., White Plains, N.Y.

[21] Appl. No.: 434,683

[22] Filed: Oct. 15, 1982

[51] Int. Cl.³ .............................................. C08G 59/50
[52] U.S. Cl. .................................. 528/111; 525/504; 528/99; 528/407; 523/417
[58] Field of Search .......................... 528/111, 99, 407; 525/504

[56] References Cited

U.S. PATENT DOCUMENTS 3,380,881  4/1968  Williamson et al. ............ 528/111 X
3,496,138  2/1970  Sellers ................................. 528/111

Primary Examiner—Earl A. Nielsen
Attorney, Agent, or Firm—Robert A. Kulason; Jack H. Park; Richard A. Morgan

[57] ABSTRACT

An epoxy resin composition is disclosed. The epoxy resin is useful as a flexible adhesive.

The composition comprises a modified epoxy base resin with a curing agent. The resin is modified by partial reaction with a polyoxyalkylene monoamine. No solvent is present in the formulation.

16 Claims, No Drawings

ONE COMPONENT WATER REDUCED EPOXY ADHESIVES

BACKGROUND OF THE INVENTION

1. Field of the Invention

This invention relates to curable epoxy resins. More particularly it relates to one and two component epoxy resin compositions which are useful as flexible adhesives and which do not rely upon a solvent for their low viscosity.

2. Prior Art

Epoxy resins constitute a broad class of polymeric materials having a wide range of physical properties. The resins are characterized by epoxide groups which are cured by reaction with certain catalysts or curing agents to provide cured epoxy resin compositions with certain desirable properties.

The most common epoxy resins are a condensation product of epichlorohydrin and bisphenol A. This system can be cured with any of the conventional curing agents such as polyamines, polycarboxylic acids, anhydrides and Lewis acids. Bisphenol A based epoxy compositions when cured have good adhesive properties but many are inherently stiff and brittle and hence their use is limited to applications where tensile shear forces do not come into play.

It has been found that plasticizers can be added to the epoxy resin adhesive system to improve flexural strength. Typical methods of plasticization include the addition of flexibilizing aliphatic amines to the curing agent, addition of aminated or carboxylated rubbers to the system, addition of carboxy-terminated polyesters, addition of organic hydroxyl containing compounds and the addition of epoxidized oils.

In H. N. Vazirani Adhesives Age 23, No. 10, p. 31 is described reaction products of liquid epoxy resins with a polyoxypropylene diamine which are useful in flexibilizing adhesive systems.

It is well known in the art that there is a need for an epoxy system that will produce a flexible cured resin with good adhesive properties.

SUMMARY OF THE INVENTION

The invention comprises a two part epoxy resin composition which relies on its inherent low viscosity and hence requires no solvent for use. In one embodiment, the two parts are kept separate and mixed immediately before use. In another embodiment a latent curative agent is used and the two parts are mixed to form a stable emulsion which may be stored for periods of time prior to use.

The first part of the composition, hereinafter referred to as Part A or base resin, is a polyepoxide which has been reacted with from about 50 wt % to about 70 wt % of a polyoxyalkylene monoamine of molecular weight of about 900 to about 2000. Part B is a curative agent. The one component system is mixed with a latent curative agent. The two component system is mixed with an effective amount of any of the typical epoxy curative agents immediately prior to use. The system contains no solvent.

DESCRIPTION OF THE PREFERRED EMBODIMENTS

Part A of the two part composition of the present invention comprises an epoxy base resin. The preferred epoxy base resin is a a vicinal polyepoxide containing compound. Generally the vicinal polyepoxide containing compounds which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy) phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, derivatives of aromatic amines, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3-3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

Because of the typically rigid epoxy systems, polyglycidyl ethers of novolac resins, polyglycidyl derivatives or aromatic amines, i.e. tetraglycidyl methylene dianiline and other normally rigid epoxy structures may be modified with polyoxyalkylene monoamines in order to promote flexibility.

The epoxy base resin is modified by partially reacting it with a polyoxyalkylene monoamine of molecular weight of about 900 to about 2000. That is, with from about 50 wt % to about 70 wt % and preferably about 55 wt % to about 65 wt % of polyoxyalkylene monoamine. The polyoxyalkylene monoamine is preferably a block copolymer of ethylene oxide and propylene oxide terminated with a primary amino group.

Compositions which use less than 50 wt % polyoxyalkylene monoamine demonstrate less flexibility with high viscosity. Compositions wherein greater than 70 wt % polyoxyalkylene monoamine is incorporated demonstrate lowered adhesive strength and decreased viscosity in solutions. Flexibility and viscosity are most beneficially balanced when from about 55 wt % to about 65 wt % of polyoxyalkylene monoamine are reacted with the epoxy base resin. The polyoxyalkylene monoamine is preferably a block copolymer of ethylene oxide and propylene oxide terminated with a primary amino group. It is seen from the Examples that diamines in general produce unsatisfactory results.

In the one component system, epoxy base resins reacted with less than 50 wt % of polyoxyalkylene monoamine produce adhesives with low peel strength. Those modified with greater than 70 wt % display decreased viscosities.

It has been found that polyoxyalkylene monoamines of molecular weight from about 900 to about 2000 produce a group of flexible epoxy resins demonstrating superior qualities for an adhesive.

Monoamines and diamines of molecular weight less than about 900 produce highly viscous epoxy systems without the desired adhesive properties. Amines of molecular weight greater than 2000 produce adhesives displaying high peel strength but so viscous that they cannot be mixed and applied without solvent thinner and therefore are useless in applications where a solvent free adhesive is required.

A group of polyoxyalkylene monoamines has been found that demonstrates beneficial properties and which is characterized by the general formula:

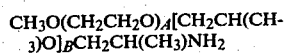

wherein A ranges from about 16 to about 25 and B ranges from about 1 to about 5.

This group of polyoxyalkylene monoamines has a molecular weight of from 900 to 2000 and preferably from 900 to 1100.

This group of monoamines is also a block copolymer of oxyethylene groups (—CH$_2$CH$_2$O—) and oxypropylene groups [—OCH$_2$CH(CH$_3$)—].

Monoamines of this type are marketed by Texaco Chemical Co., Inc. under the trademark JEFFAMINE® M-series.

Part B of the two part composition of the present invention comprises a curative agent and optionally an accelerator. The epoxy base resin is cured with any of the anhydrides, aliphatic amines and polyamides typically used and known in the art for curing epoxy base resins.

One embodiment the epoxy resin composition of the present invention is a two component adhesive composition comprising:

(A) a polyepoxide which has been reacted with from about 55 wt % to about 65 wt % of a polyoxyalkylene monoamine of the general formula:

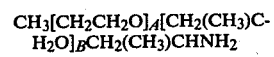

wherein A ranges from 16 to 20 and B ranges from 1 to 5; and (B) a curative agent.

The amine curative agents which can be utilized in accordance with the two component embodiment of the present invention are generally any of those amine curative agents which are well known to be useful for the curing of vicinal epoxides. Generally, those curative agents having at least three reactive amino hydrogens are useful. Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4,7,10-trioxatridecane.

Additionally, aromatic amine curative agents are useful, such as the alkylene-linked polyphenyl amines, phenylene diamines and polycyclic or fused aromatic primary amine compounds. Further, the corresponding cycloaliphatic primary amine, i.e., the hydrogenated products of the above aromatic compounds, can be utilized.

Likewise, the polyamide curative agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

As seen in the Examples, a preferred curative agent for the two component system is N-aminoethylpiperazine.

In another embodiment, the present invention is related to a one component epoxy resin composition comprising:

(A) a polyepoxide which has been reacted with from about 55 wt % to about 65 wt % of a polyoxyalkylene monoamine of general formula:

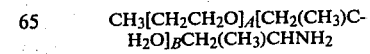

(B) a latent curative agent

The latent curative agent may be any one of the many curative agents known in the art for curing of vicinal epoxides but which are unreactive with epoxy base resins until heat cured.

Latent curatives are agents that when combined with an epoxy base resin, provide an extended pot life (up to six months or longer) with little or no reaction taking place. Among materials commonly used for this purpose are boron trifluoride-amine complexes, amine salts and certain solid materials which may be finely dispersed into an epoxy base resin where they remain unreacted until the temperature of the system is raised to the point sufficient to melt the solid curative and promote curing. Such a material is dicyandiamide (DICY; cyanoguanidine). Dicyandiamide is the curative of choice for the present invention since experience has shown that it does not degrade over prolonged periods of time.

In the formulation of the epoxy system, the latent curative agent and optionally an accelerator are mixed to form a compatible solution. The modified epoxy base resin is added and the mixture is stirred until homogeneous. The mixture thereby produced is a stable dispersion of solid curative in resin which may be stored for prolonged periods prior to use.

The curative agent is usually added to the formulation in such an amount that there is one reactive NH group in the curing component for each epoxy group in the epoxy resin component. These are known as stoichiometric quantities. The stoichiometric quantity can be calculated from the knowledge of the chemical structure and analytical data on the component.

Stoichiometry unfortunately is not always calculatable. This is especially true with many latent systems. For latent systems, the proper amount of curative to provide best properties must be determined experimentally.

For the purposes of the present invention, the stoichiometric amount of curative agent is calculated by adding together the number of equivalents on the basis of weight percent replaceable NH groups. In general, it is advantageous to use up the 10% excess of the curative agent over the stoichiometric amount.

In the two component system the epoxy base resin and curative agent are mixed immediately, prior to use whereas as the one component system exists as a stable dispersion and is applied directly to the surface before curing.

With many curatives, curing may be accomplished at ambient conditions. For development of optimum achievable properties, however, curing at elevated temperature is necessary. The curing temperature range acceptable in this invention is from about 120° C. to about 180° C. for about 1 to 3 hours. Preferably curing is done at about 150° C. for 1 to 2 hours.

Optionally, the epoxy resin formulations of the present invention can include an accelerator to speed the amine cure of the epoxy resin. In several applications, an accelerator is beneficial, especially when an epoxy resin is used as an adhesive in flammable environment, thus making prolonged elevated temperature cure inconvenient or even hazardous. Lee, H. and Neville, K., *Handbook of Epoxy Resins*, pp. 7–14 describes the use of certain amine-containing compounds as epoxy curative agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072, G. Waddill. That accelerator comprises a combination of piperazine and an alkanol amine in a weight ratio of about 1:8 to 1:1. The above amount of accelerator is admixed with a polyoxyalkylene diamine curative agent in amount of from about 10 to 50 parts by weight accelerator to 100 parts by weight of the curing agent.

The following Examples are illustrative of the nature of the instant invention but are not intended to be limitative thereof.

EXAMPLE I

Preparation of Flexibilizing Epoxy Adduct from a Polyoxyethylene Monoamine

Reactants

| | |
|---|---|
| Liquid epoxy resin (EEW 190) | 100 pbw |
| Polyoxyethylene monoamine | 60 pbw |

Procedure

Epoxy resin was placed in 2-liter resin flask equipped with stirrer, thermometer, nitrogen inlet, cold water condenser and dropping funnel containing the amine. The resin was heated under nitrogen to 125° C. The amine was then added rapidly with vigorous stirring. The resulting product was digested at 125° C. under nitrogen for one hour before cooling and packaging.

| Properties of product: | Brookfield viscosity | 7300 cps |
|---|---|---|
| | Total amine, meq/g | 0.31 |
| | Epoxide content, meq/g | 2.90 |
| | Epoxy equivalent wt. | 345 |

[1]JEFFAMINE ® M1000, available from Texaco Chemical Company, Houston, Texas.
Structure:
$CH_3O[CH_2CH_2O]_{18.6}[CH_2(CH_3)CH_2O]_{1.6}CH_2(CH_3)CHNH_2$
Molecular weight approx. 1000

EXAMPLE II

Viscosities of Polyoxyalkyleneamine Epoxy Adducts Brookfield Viscosity at 25° C. at Polyetheramine Content, phr.

| | 20 | 30 | 40 | 50 | 60 | 80 |
|---|---|---|---|---|---|---|
| JEFFAMINE ® D2000[1] | 36000 | 56500 | 57300 | — | 136000 | — |
| JEFFAMINE ® D400/D2000[2] | 170000 | 504000 | 1.4MM | — | — | — |
| JEFFAMINE ® ED 2001[3] | 21250 | 27000 | 32000 | 34400 | 44500 | 52600 |
| JEFFAMINE ® ED 900[4] | 134000 | 388000 | 970000 | — | — | — |
| JEFFAMINE ® M 360[5] | — | — | 170000 | — | 504000 | — |
| JEFFAMINE ® M 600[6] | — | — | 60400 | 83200 | 110000 | — |
| JEFFAMINE ® M 1000[7] | 9700 | 7750 | 8250 | — | 7300 | 6500 |

From the above results, it is apparent that only one series of adducts, those prepared from JEFFAMINE® M-1000 were of consistently low viscosity regardless of amine content. This viscosity decreased with increased amount of monoamine. Others exhibited a progressive increase in viscosity to rather excessive levels.

---

[1] Structure: $H_2NCH(CH_3)CH_2[OCH_2CH(CH_3)]_xNH_2$
    $x = 33.1$
    Molecular weight 2000
[2] Mixture of JEFFAMINE® D 400 (structure $H_2NCH(CH_3)CH_2[OCH_2CH(CH_3)]_xNH_2$
    $x = 5.6$
    and JEFFAMINE® D 2000 with an average molecular weight of 1000.
[3] Structure: $O[(CH_2CH_2O)_A(CH_2CH(CH_3)O)_B(CH_2CH(CH_3)NH_2)]_2$
    $A = 20.9$  $B = 0.75$
    Molecular weight 2000
[4] Structure: $O[(CH_2CH_2O)_A (CH_2CH(CH_3)O)_B [CH_2CH(CH_3)-NH_2]_2$
    $A = 7.8$  $B = 0.75$
    Molecular weight 900
[5] Structure: $CH_3CH_2CH_2CH_2O[CH_2CH_2O]_x[CH_2CH(CH_3)O]_y CH_2CH(CH_3)NH_2$
    $x = 4$  $y = 1$
    Molecular weight 365
[6] Structure: $CH_3OCH_2CH_2[OCH_2CH(CH_3)]_9NH_2$
    Molecular weight 600
[7] Structure: $CH_3O[CH_2CH_2O]_{18.6}[CH_2(CH_3)CH_2O]_{1.6}CH_2(CH_3)CHNH_2$
    Molecular weight 1000

Properties of One-Component Epoxy Adhesive Formulations[1] with Polyetheramine—Modified Epoxy Resins

| Amine Adduct | Polyetheramine concn., phr | T-Peel Strength, pli | Tensile Shear Strength, psi |
|---|---|---|---|
| JEFFAMINE® M1000 | 0 | 3.5 | 3800 |
|  | 20 | 3.4 | 3600 |
|  | 40 | 3.9 | 3100 |
|  | 60 | 24.5 | 1800 |
|  | 70 | 8.8 | 800 |
|  | 100 | 2.5 | 400 |
| JEFFAMINE® D2000 | 0 | 3.5 | 3800 |
|  | 20 | 6.3 | 4000 |
|  | 30 | 7.3 | 4200 |
|  | 40 | 7.4 | 3700 |
|  | 60 | 19.4 | 1200 |
| JEFFAMINE® D400/ D2000 | 0 | 3.5 | 3800 |
|  | 20 | 5.4 | 4100 |
|  | 30 | 6.5 | 3800 |
|  | 40 | 11.3 | 3800 |
| JEFFAMINE® ED2001 | 0 | 3.5 | 3800 |
|  | 20 | 4.5 | 3600 |
|  | 40 | 8.1 | 3100 |
|  | 50 | 9.7 | — |
|  | 60 | 49.1 | 1800 |
|  | 70 | 38.8 | 800 |
|  | 80 | 27.9 | 500 |

[1] Dicyandiamine (DICY; eq. wt. 24.4) was dispersed into the epoxyamine adduct to form a stable one-component adhesive system. Curing cycle: one hour at 178° C.

Thus, the adduct prepared from M1000 optimized peel strength at 60 phr. with a viscosity of 7300 cps. Other adducts optimized adhesive properties at concentrations that led to much higher viscosities.

Properties of Two-Component Epoxy Adhesive Formulations[1] with Polyetheramine Modified Epoxy Resins

| Amine Adduct | Polyetheramine concn., phr | T-Peel Strength, pli | Tensile Shear Strength, psi |
|---|---|---|---|
| JEFFAMINE® M1000 | 0 | 3300 | 3.4 |
|  | 20 | 3800 | 4.1 |
|  | 40 | 2300 | 27.8 |
|  | 60 | 1300 | 25.0 |
| JEFFAMINE® D2000 | 0 | 3300 | 3.4 |
|  | 20 | 3500 | 6.2 |
|  | 30 | 3750 | 9.7 |
|  | 40 | 3100 | — |
|  | 60 | 2200 | — |
| JEFFAMINE® D400/ D2000 | 0 | 3300 | 3.4 |
|  | 10 | 3650 | 3.6 |
|  | 20 | 4140 | 5.2 |
|  | 30 | 3950 | 6.3 |
|  | 40 | 3150 | — |
| JEFFAMINE® ED2000 | 0 | 3300 | 3.4 |
|  | 20 | 4150 | 4.6 |
|  | 30 | 3770 | 4.6 |
|  | 40 | 2900 | 21.3 |

[1] Curative: N-aminoethylpiperazine (AEP); cure cycles: 2 hrs., 110° C.

The principle of the invention and the best mode contemplated for applying that principle have been described. It is to be understood that the foregoing is illustrative only and that other means and techniques can be employed without departing from the true scope of the invention defined in the following claims.

What is claimed is:

1. An epoxy resin composition comprising:
   (A) a polyepoxide which has been reacted with from 50 wt % to 70 wt % of a polyoxyalkylene monoamine of molecular weight 900 to 2000; and
   (B) a curative agent.

2. The composition of claim 1 wherein the polyepoxide is selected from the group consisting of bisphenol A type resins, polyglycidyl ethers of novolac resins and polyglycidyl derivatives of aromatic amines.

3. The composition of claim 1 wherein the polyepoxide is a bisphenol A type resin.

4. The composition of claim 1 wherein the polyoxyalkylene monoamine has the general formula:

$$CH_3O[CH_2CH_2O]_4[CH_2(CH_3)CH_2O]_BCH_2(CH_3)CHNH_2$$

wherein A ranges from 16 to 25 and B ranges from 1 to 5.

5. The composition of claim 1 wherein the polyoxyalkylene monoamine has the general formula:

$$CH_3O[CH_2CH_2O]_{18.6}[CH_2(CH_3)CH_2O]_{1.6}CH_2(CH_3)CHNH_2.$$

6. The composition of claim 1 wherein the curative agent is a latent curative agent.

7. The composition of claim 1 wherein the curative agent is dicyandiamide.

8. The composition of claim 1 wherein the curative agent is N-aminoethylpiperazine.

9. The composition of claim 1 wherein the polyepoxide is reacted with from 55 wt % to 65 wt % of the polyoxyalkylene monoamine.

10. The composition of claim 1 which additionally comprises an accelerator.

11. A one component epoxy resin adhesive composition comprising:
(A) a polyepoxide which has been reacted with from 55 wt % to 65 wt % of a polyoxyalkylene monoamine of general formula:

$$CH_3O[CH_2CH_2O]_A[CH_2(CH_3)CH_2O]_BCH_2(CH_3)CHNH_2$$

wherein A ranges from 16 to 20 and B ranges from 1 to 5; and
(B) a latent curative agent.

12. The composition of claim 11 wherein the latent curative agent is dicyandiamide.

13. The composition of claim 11 which additionally comprises an accelerator.

14. A two component epoxy resin adhesive composition comprising:
(A) a polyepoxide which has been reacted with from 55 wt % to 65 wt % of a polyoxyalkylene monoamine of general formula:

$$CH_3O[CH_2CH_2O]_A[CH_2(CH_3)CH_2O]_BCH_2(CH_3)CHNH_2$$

wherein A ranges from 16 to 20 and B ranges from 1 to 5; and
(B) a curative agent.

15. The composition of claim 14 wherein the curative agent is N-aminoethylpiperazine.

16. The composition of claim 14 which additionally comprises an accelerator.

* * * * *